April 12, 1960
G. K. ROEDER
2,932,312
VALVE SYSTEM FOR PUMPS
Filed Jan. 14, 1957
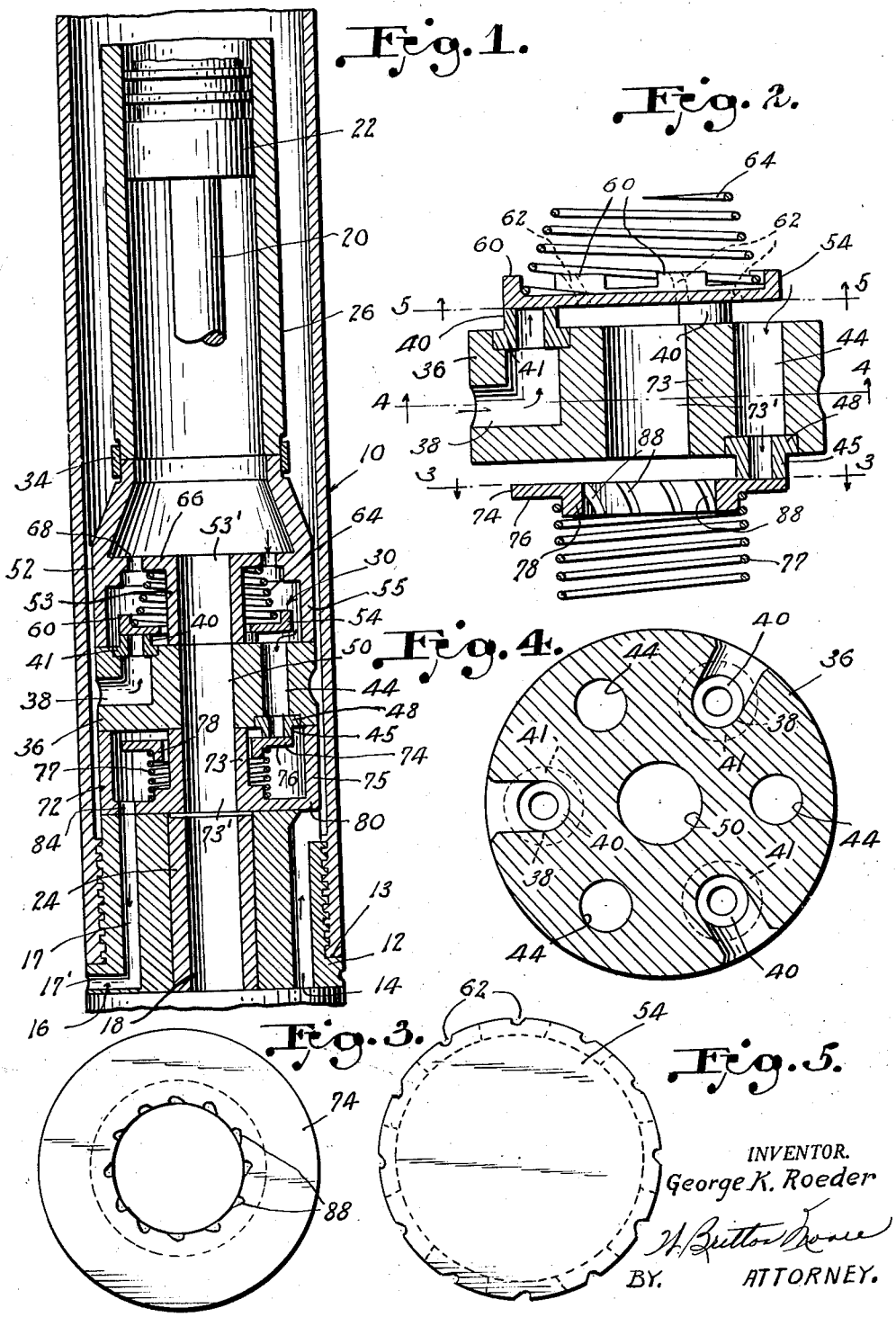
INVENTOR.
George K. Roeder
BY.
ATTORNEY.

United States Patent Office 2,932,312
Patented Apr. 12, 1960

2,932,312

VALVE SYSTEM FOR PUMPS

George K. Roeder, Kilgore, Tex.

Application January 14, 1957, Serial No. 633,916

1 Claim. (Cl. 137—332)

This invention relates to a valve system for use in fluid operated pumps of the deep well type employed in pumping oil from underground deposits, and particularly relates to improvements in the intake and exhaust valves.

In general, pumps used for this purpose must fit inside a well casing at the lower end thereof. As the casings are of relatively small diameter, the pumps usually are of the so-called double ended type including a motor end and a pump end, the motor end comprising a piston working in a cylinder and the pump end similarly comprising a piston working in a cylinder, with a rod inter- connecting the motor piston and the pump piston. The motor piston is reciprocated by fluid delivered to the motor section and this reciprocating motion is transmitted by means of the connecting rod to the pump piston. On the intake or suction stroke of the pump piston, the fluid to be pumped is drawn through an intake check valve into the pump cylinder, and on the exhaust or pressure stroke the intake check valve is closed and the fluid is forced through an exhaust check valve into the well casing and ultimately out of the well.

Typical prior art intake and exhaust valves used in these pumps consist of cylindrical valve cages or bodies provided with a plurality of valved ports and central apertures through which the pump connecting rods extend. Ball valves arranged in the valve cages are acted on directly by spring driven valve plates which alternately force the balls onto their seats, closing the valves, or allow them to move off their seats under the influence of the fluid being pumped, opening the valves.

In the field, these pumps are operated at high speeds to keep up the desired oil production rate. Operation of the pump at high speed requires that the balls move at great speeds and results in rapid and forceful pounding of the seats, plate and other parts of the valve housing and damage to these parts. Fluid under pressure acting on the balls also tends to give them a fluttering circular motion which also causes excessive wear on the seats and other parts of the housing. This movement of the balls and the damage caused thereby generally results in pump failures, requiring removal and repair of the pump which is costly from a repair and loss of production standpoint.

Accordingly, it is an object of the present invention to provide a valve assembly for a deep well pump which will not wear excessively and is durable and capable of withstanding the forces accompanying high speed operation encountered in the field.

A further object is the provision of a valve assembly for fluid operated pumps wherein wear and damage to the valve cage or valve seat is eliminated or materially reduced.

A more specific object of the invention is the provision of a valve assembly of simple construction and easy to install.

These and other objects and advantages will be apparent as specification is considered with the accompanying drawings, wherein:

Figure 1 is a view partly in section of the pump end of a deep well pump showing the valve assembly, arrows being properly placed to show the direction of flow of fluid in the pump;

Figure 2 is an enlarged sectional view of the valve assembly, arrows being properly placed to show the direction of flow of fluid in the valve, as in Figure 1;

Figure 3 is a section taken on the line 3—3 of Figure 2;

Figure 4 is a section taken on the line 4—4 of Figure 2; and

Figure 5 is a section taken on the line 5—5 of Figure 2.

Referring more particularly to the drawings, wherein like reference characters designate similar parts throughout the several views, and with particular reference to Figure 1, it will be noted that the pump end of a unit employing the present valve assembly includes an outer tubular housing 10 in the lower end of which is inserted a cylindrical plug 12, cooperating threads being provided on the plug and the housing for removably retaining them in the relationship shown. The plug 12 has a shoulder 13 adapted to abut the lower end of the housing 10. One or more longitudinally extending intake passages 14 are formed in the plug 12 and communicate with the interior of the housing 10 thereby permitting passage of the oil or other fluid into the pump. One or more exhaust passages 16 is also formed in the plug 12, each of said ports 16 having a longitudinally extending portion 17 and a shorter portion 17' extending at a right angle thereto to allow the oil to be forced from the interior of the housing 10 into a space between a well casing, not shown, and said housing 10. The plug 12 also has a longitudinally extending central bore 18 for slidably receiving a connecting rod 20, partially shown, which imparts reciprocating movement to a pump piston 22 when the pump is in operation. A suitable packing sleeve 24 is arranged between the rod 20 and the plug 12 to prevent fluid from leaking out of the pump around the connecting rod. Of course, the pump piston 22 is equipped with suitable piston rings, not shown, to provide the required tolerance between the piston 22 and the wall of cylinder 26.

The valve assembly is represented generally by numeral 30, and is positioned between the plug 12 and the pump cylinder 26, and a ring 34 is arranged at the joint between the cylinder 26 and upper end of the valve assembly 30 to serve as a coupling and for maintaining the cylinder and valve assembly in alignment. The valve assembly includes a valve body 36 which is positioned between an intake valve cage 52 and an exhaust valve cage 72. A series of three L-shaped intake valve ports 38 is formed in the valve body 36, this port being arranged in spaced relationship and communicating at one end with the space between the valve assembly and the housing 10 and at the other end with the interior of the intake valve cage 52. The upper end of each of the intake ports 38 is enlarged to provide an annular seat within which is press fitted an enlarged annular flange portion 41 of a hollow upwardly extending standoff valve seat 40. Each of the valve seats 40 projects slightly above the upper face of the valve body 36 and into the interior of the intake valve cage 52, for a purpose to be presently described.

The valve body 36 is also provided with three exhaust ports 44 arranged in spaced relationship in said body and extending longitudinally thereof to provide communication between the interior of the intake valve cage 52 and the exhaust valve cage 72. The lower end of each of the exhaust ports 44 is similarly enlarged to provide an annular seat within which is press fitted an enlarged annular flange portion 48 of a hollow downwardly extending standoff valve seat 45. Each of the valve seats projects slightly below the lower face of the valve body 36 and into the interior of the exhaust valve cage 72, for a purpose also to be hereinafter described. The connecting rod 20 is adapted to slidably project through a central bore 50 extending through the valve body 36.

The intake valve cage 52 is of cylindrical form having an outer wall 55 spaced circumferentially from a central hub 53 with a longitudinal bore 53' formed therein and a closed upper end wall 66. The outer wall 55 has a stepped section near the end wall 66 and tapers upwardly and inwardly to its point of coupling juncture 34 with the pump cylinder 26. Slidably arranged on the lower end of the hub 53 of intake valve cage 52 and arranged within the cavity between the hub and wall 55 thereof is an intake valve disk 54. The intake valve disk 54 is formed with a series of circumferentially spaced upwardly projecting lips 60. The enlarged lower end of a coil spring 64 having a reduced upper end seats upon the upper face of disk 54 and, as best shown in Figure 1, the upper end of the spring 64 engages the underside of the intake valve cage upper end wall 66. The lips 60 serve to retain the spring 64 on the intake valve disk 54 and the spring tends to resiliently urge the disk 54 into closed seating position against the upper ends of the standoff valve seats 40. A plurality of ports 68 is provided in the upper end wall 66 of valve cage 52 to permit the flow of oil out of the intake valve cage into the pump cylinder on the suction stroke of the pump. Formed on the outer annulus of the intake valve disk 54 and on the lips 60 are a series of longitudinally extending curved grooves or channels 62 through which the upwardly flowing fluid will pass and thereby impart a rotary movement to the disk 54, for a purpose to be presently described.

Like the intake valve cage, the exhaust valve cage 72 is of cylindrical form and comprises an outer wall 75 spaced circumferentially from a central hub 73 having a longitudinal bore 73' formed therein and a closed lower end wall 80. Slidably arranged on the upper end of the hub 73 and within the cavity between the hub and wall 75 is an exhaust valve disk 74. The exhaust valve disk 74 includes a flat face 76 and a central hub 78 to engage with the upper end of a coil spring 77, the lower end of which engages with an enlarged shoulder portion of the cage hub 73, as best shown in Figure 1. Suitable ports 84 are formed in the end wall 80 of exhaust cage 72 and serve to communicate with the exhaust passages 16 in the plug 12 thereby permitting oil to flow out of the pump and thence into the upper part of the well. The spring 77 tends to urge the valve disk 74 upwardly into closed position against the lower ends of the exhaust valve seats 45 in the valve body 36.

As best shown in Figures 2 and 3, a series of longitudinally extending curved grooves or channels 88 are formed in the inner wall of the central hub 78 of the exhaust valve disk 74 so that upward flow of fluid through the channels 88 imparts a rotary movement to the exhaust valve disk 74. Thus, as both the intake and exhaust valve disks are caused to rotate by the flow of fluid, it will be apparent that the seating relationship between the disks 54—74 and the standoff valve seats 40—46 is constantly changing which tends to reduce wear at these areas.

From the foregoing, it will be apparent that on suction stroke of the pump, fluid will be drawn upwardly through intake passage 14 and into the annular space between the valve assembly and the housing 10. The fluid thereafter flows into and through intake ports 38 in valve body 36 and through standoff valve seats 40 into the interior of intake valve cage 52. Flow through valve seats 40 lifts the valve disk 54 off the seats 40 against the tension of spring 64. The fluid then flows through ports 68 in the end wall 66 of the intake valve cage 52 and into the interior of the pump cylinder 26.

On the pressure stroke of the pump piston 22, fluid is forced downwardly out of the pump cylinder and through ports 68 into the intake valve cage 52. Downward flow of fluid acts on the valve disk 54 to move the latter to closed position relative to the standoff valve seats 40. Thus, fluid will flow downwardly through exhaust ports 44 in the valve body 36 and through the standoff valve seats 45 forcing the valve disk 74 downwardly against the action of spring 77 and away from the seats 45. Fluid is thereby permitted to flow through the interior of the exhaust valve cage 72 and downwardly through ports 84 in the bottom end wall 80 thereof from whence it passes through exhaust passages 17 and out of the pump.

The standoff valve seats, both intake and exhaust, are constructed of extremely hard material to withstand wear. The arrangement of the standoff seats projecting beyond the top and bottom surfaces of the valve body provides relatively small annular seating surfaces for the valve disks so that the fluid being pumped will circulate over these seating surfaces and prevent sand or other foreign material from collecting thereon. This action insures clean valve seats, reduces wear and insures a better seal. Furthermore, rotation of the valve disks 54 and 74 reduces wear on these members. It is apparent that the valve disks of my valve will continue to operate even should a spring break, whereas with ball valves the seats pound out after a spring breaks.

While I have shown and described a preferred embodiment of my invention, it is to be understood that various changes and modifications may be made without departing from the scope and spirit of the appended claim.

What I claim is:

A valve structure including a horizontally extending circular hub, said hub having a plurality of circumferentially spaced exhaust ports extending vertically therethrough, said hub having a like number of L-shaped intake ports formed therein in circumferentially spaced relation to each other and each positioned between a pair of said exhaust ports, said intake ports each communicating with the top and side of said hub, a plurality of circumferentially spaced upwardly extending intake standoff valve seats mounted in the upper face of said hub each in communication with one of said intake ports and each extending upwardly above the upper face of said hub, a circular intake valve disc normally bearing against said intake valve seats, a plurality of circumferentially spaced upwardly extending ears formed integrally with the peripheral portion of said intake valve disc, the outer edge of said intake valve disc and outer faces of said ears having formed therein a plurality of spaced curved channels, a compression spring engaging the top of said intake valve disc and the inner faces of said ears and normally urging said intake valve disc into engagement with intake valve seats, a plurality of circumferentially spaced downwardly extending exhaust valve standoff seats mounted in the lower face of said hub, said exhaust valve seats each in communication with one of said exhaust ports and each extending downwardly below the lower face of said hub, a circular exhaust valve disc normally bearing against said exhaust valve seats, a hollow central hub provided in said exhaust valve disc and extending downwardly therefrom, said hollow hub having a series of longitudinally extending curved channels formed in its inner wall, a compression spring surrounding said hollow hub and bearing against the underside of said exhaust valve disc and normally urging said exhaust valve disc into engagement with said exhaust valve seats, and means providing an intermittent flow of fluid through said intake and exhaust ports, said fluid flow acting upon said channels to revolve said intake valve disc and said exhaust valve disc, whereby concentration of wear at each valve disc area is greatly reduced.

References Cited in the file of this patent

UNITED STATES PATENTS

| | | |
|---|---|---|
| 259,830 | Du Bois | June 20, 1882 |
| 957,811 | Strong | May 10, 1910 |
| 1,596,037 | Warner | Aug. 17, 1926 |
| 1,638,114 | Dunlap et al. | Aug. 9, 1927 |
| 1,777,647 | Marchal | Oct. 7, 1930 |
| 1,901,478 | Sutton et al. | Mar. 14, 1933 |
| 2,081,222 | Coberly | May 25, 1937 |
| 2,158,351 | Ames et al. | May 16, 1939 |
| 2,771,902 | Winchester | Nov. 27, 1956 |
| 2,781,778 | Lisciani | Feb. 19, 1957 |
| 2,807,277 | Bailey et al. | Sept. 24, 1957 |